(12) United States Patent
Njemanze et al.

(10) Patent No.: US 7,809,131 B1
(45) Date of Patent: Oct. 5, 2010

(54) ADJUSTING SENSOR TIME IN A NETWORK SECURITY SYSTEM

(75) Inventors: Hugh S. Njemanze, Los Altos, CA (US); Hector Aguilar-Macias, Sunnyvale, CA (US)

(73) Assignee: ArcSight, Inc., Cupertino, CA (US)

( * ) Notice: Subject to any disclaimer, the term of this patent is extended or adjusted under 35 U.S.C. 154(b) by 946 days.

(21) Appl. No.: 11/021,601

(22) Filed: Dec. 23, 2004

(51) Int. Cl.
*G06F 11/00* (2006.01)
(52) U.S. Cl. .............................. 380/2; 726/23; 713/100; 713/178; 702/89; 702/187
(58) Field of Classification Search ................. 713/176, 713/178; 726/22–24; 370/389, 503
See application file for complete search history.

(56) References Cited

U.S. PATENT DOCUMENTS

| | | | |
|---|---|---|---|
| 5,557,742 A | 9/1996 | Smaha et al. | |
| 5,606,668 A * | 2/1997 | Shwed | 726/13 |
| 5,717,919 A | 2/1998 | Kodavalla et al. | |
| 5,850,516 A | 12/1998 | Schneier | |
| 5,956,404 A | 9/1999 | Schneier et al. | |
| 5,978,475 A | 11/1999 | Schneier et al. | |
| 6,070,244 A | 5/2000 | Orchier et al. | |
| 6,088,804 A * | 7/2000 | Hill et al. | 726/25 |
| 6,134,664 A | 10/2000 | Walker | |
| 6,192,034 B1 | 2/2001 | Hsieh et al. | |
| 6,275,942 B1 | 8/2001 | Bernhard et al. | |
| 6,295,541 B1 * | 9/2001 | Bodnar et al. | 707/203 |
| 6,321,338 B1 | 11/2001 | Porras et al. | |
| 6,347,084 B1 * | 2/2002 | Hulyalkar et al. | 370/347 |
| 6,408,391 B1 | 6/2002 | Huff et al. | |
| 6,408,404 B1 | 6/2002 | Ladwig | |
| 6,449,291 B1 * | 9/2002 | Burns et al. | 370/516 |
| 6,484,203 B1 | 11/2002 | Porras et al. | |
| 6,510,150 B1 * | 1/2003 | Ngo | 370/347 |
| 6,542,075 B2 | 4/2003 | Barker et al. | |
| 6,687,752 B1 * | 2/2004 | Falco et al. | 709/230 |
| 6,694,362 B1 | 2/2004 | Secor et al. | |

(Continued)

FOREIGN PATENT DOCUMENTS

WO  WO 9962216 A2 * 12/1999

(Continued)

OTHER PUBLICATIONS

Jueneman et al., "Explicit Path Routing for Switching Networks", www.ip.com, Feb. 1, 1976, p. 1-4.*

(Continued)

*Primary Examiner*—William R Korzuch
*Assistant Examiner*—Michael R Vaughan
(74) *Attorney, Agent, or Firm*—Fenwick & West LLP

(57) ABSTRACT

Sensor device times can vary and may be set significantly wrong. In one embodiment, the present invention can adjust a sensor's time by receiving a raw security event from a sensor device, determining whether a timestamp included in the raw security event is within a timerange around a time known by the agent, determining whether a time offset is in a non-initialized state, and determining whether to adjust the timestamp by applying the time offset to the timestamp, the determination being based on whether the timestamp included in the security event is within the timerange around the time known by the agent and whether the time offset is in a non-initialized state.

12 Claims, 2 Drawing Sheets

U.S. PATENT DOCUMENTS

| | | | |
|---|---|---|---|
| 6,698,022 B1* | 2/2004 | Wu | 725/111 |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,760,687 B2* | 7/2004 | Apel et al. | 702/187 |
| 6,839,850 B1 | 1/2005 | Campbell et al. | |
| 6,928,556 B2 | 8/2005 | Black et al. | |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 7,039,953 B2 | 5/2006 | Black et al. | |
| 7,043,727 B2* | 5/2006 | Bennett et al. | 718/100 |
| 7,058,089 B2* | 6/2006 | Franchuk et al. | 370/503 |
| 7,089,428 B2 | 8/2006 | Farley et al. | |
| 7,127,743 B1* | 10/2006 | Khanolkar et al. | 726/23 |
| 7,159,237 B2 | 1/2007 | Schneier et al. | |
| 7,171,689 B2 | 1/2007 | Beavers | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,298,762 B2* | 11/2007 | Rakib | 370/468 |
| 7,308,689 B2 | 12/2007 | Black et al. | |
| 7,333,999 B1 | 2/2008 | Njemanze | |
| 7,376,969 B1 | 5/2008 | Njemanze et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0065940 A1* | 5/2002 | Suzuki et al. | 709/248 |
| 2002/0078381 A1* | 6/2002 | Farley et al. | 713/201 |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0156798 A1* | 10/2002 | Larue et al. | 707/201 |
| 2002/0184532 A1 | 12/2002 | Hackenberger et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0093435 A1* | 5/2004 | Purho | 709/400 |
| 2004/0136375 A1* | 7/2004 | Koguchi | 370/392 |
| 2004/0153716 A1* | 8/2004 | Baker | 714/4 |
| 2004/0193622 A1* | 9/2004 | Peleg et al. | 707/100 |
| 2004/0221191 A1 | 11/2004 | Porras et al. | |
| 2005/0027845 A1 | 2/2005 | Secor et al. | |
| 2005/0039065 A1* | 2/2005 | Cheung et al. | 713/400 |
| 2005/0060619 A1* | 3/2005 | Liberty et al. | 714/55 |
| 2005/0100102 A1* | 5/2005 | Gazdzinski et al. | 375/242 |
| 2005/0138674 A1* | 6/2005 | Howard et al. | 725/136 |
| 2005/0204404 A1 | 9/2005 | Hrabik et al. | |
| 2005/0251860 A1 | 11/2005 | Saurabh et al. | |
| 2005/0265334 A1* | 12/2005 | Koguchi | 370/389 |
| 2006/0053455 A1* | 3/2006 | Mani et al. | 725/87 |
| 2006/0069956 A1 | 3/2006 | Steinberg et al. | |
| 2006/0083264 A1* | 4/2006 | Jordan et al. | 370/503 |
| 2006/0095587 A1 | 5/2006 | Bhattacharya et al. | |
| 2006/0136768 A1* | 6/2006 | Liu et al. | 713/400 |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0157315 A1* | 7/2007 | Moran | 726/23 |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0125146 A1* | 5/2008 | Bainbridge | 455/466 |
| 2008/0162592 A1 | 7/2008 | Huang et al. | |
| 2008/0165000 A1 | 7/2008 | Morin et al. | |
| 2010/0058165 A1* | 3/2010 | Bhattacharya et al. | 715/227 |

FOREIGN PATENT DOCUMENTS

| | | |
|---|---|---|
| WO | WO 02/45315 A2 | 6/2002 |
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Stearley, J., "Towards informatic analysis of syslogs", International Conference onCluster Computing, 2004 IEEE, Sep. 20-23, 2004, p. 1-10.*

Jueneman et al., "Explicit Path Routing for Switching Network", ip.com Prior Art Database, Feb. 1, 1976, pp. 1-4.*

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Enterprise Coverage: Technology Architecture," date unknown, [online] Retrieved from the Internet <URL: http://www.snaiso.com/Documentation/Arcsight/arcsight_archdta.pdf>.

ArcSight, "Managed Process: ArcSight Reporting System," date unknown, [online] Retrieved from the Internet <URL: http://www.snaiso.com/Documentation/Arcsght/arcsight_reportsys.pdf>.

ArcSight, "Managed Process: Console-Based Management," date unknown, [online] Retrieved from the Internet <URL: http://www.snaiso.com/Documentation/Arcsight/arcsight_console.pdf >.

ArcSight, "Precision Intelligence: SmartRules™ and Cross-Correlation," date unknown, [online] Retrieved from the Internet <URL: http://www.snaiso.com/Documentation/Arcsight/arcsight_correlation.pdf>.

ArcSight "Precision Intelligence: SmartAgent™ ," date unknown, [online] Retrieved from the Internet <URL: http://www.ossmanagement.com/SmartAgent.pdf>.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved on Nov. 15, 2002] Retrieved from the Internet <URL: http:www.arcsight.com/product_info05.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Enterprise," 2002, [online] [Retrieved on Oct. 25, 2002] Retrieved from the Internet <URL: http:www.arcsight.com/>.

ArcSight, "Technical Brief: How Correlation Eliminates False Positives," date unknown, source unknown.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_rmalization.pdf>.

Cheung, S. et al., "EMERALD Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

U.S. Appl. No. 60/405,921, filed Aug. 26, 2002, Gisby et al.

* cited by examiner

ADJUSTING SENSOR TIME IN A NETWORK SECURITY SYSTEM

FIELD OF THE INVENTION

The present invention relates to network security devices, and, in particular, a network security system analysing data from plurality of network security devices.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, various network security monitor devices have been developed to help uncover attempts by unauthorized persons and/or devices to gain access to computer networks and the information stored therein.

Network security devices—also referred to as sensor devices, sensors, sensor products, security devices, and other similar names—largely include Intrusion Detection Systems (IDSs), which can be Network or Host based (NIDS and HIDS respectively). Other network security products include firewalls, router logs, and various other event reporting devices. Due to the size of their networks, many enterprises deploy many instances of these devices throughout their networks. Each network security device has a clock by which it tells time. However, these clocks may be out of synchronization with respect to each other.

SUMMARY OF THE INVENTION

Sensor device times can vary and may be set significantly wrong. In one embodiment, the present invention can adjust a sensor's time by receiving a raw security event from a sensor device, determining whether a timestamp included in the raw security event is within a timerange around a time known by the agent, determining whether a time offset is in a non-initialized state, and determining whether to adjust the timestamp by applying the time offset to the timestamp, the determination being based on whether the timestamp included in the security event is within the timerange around the time known by the agent and whether the time offset is in a non-initialized state.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
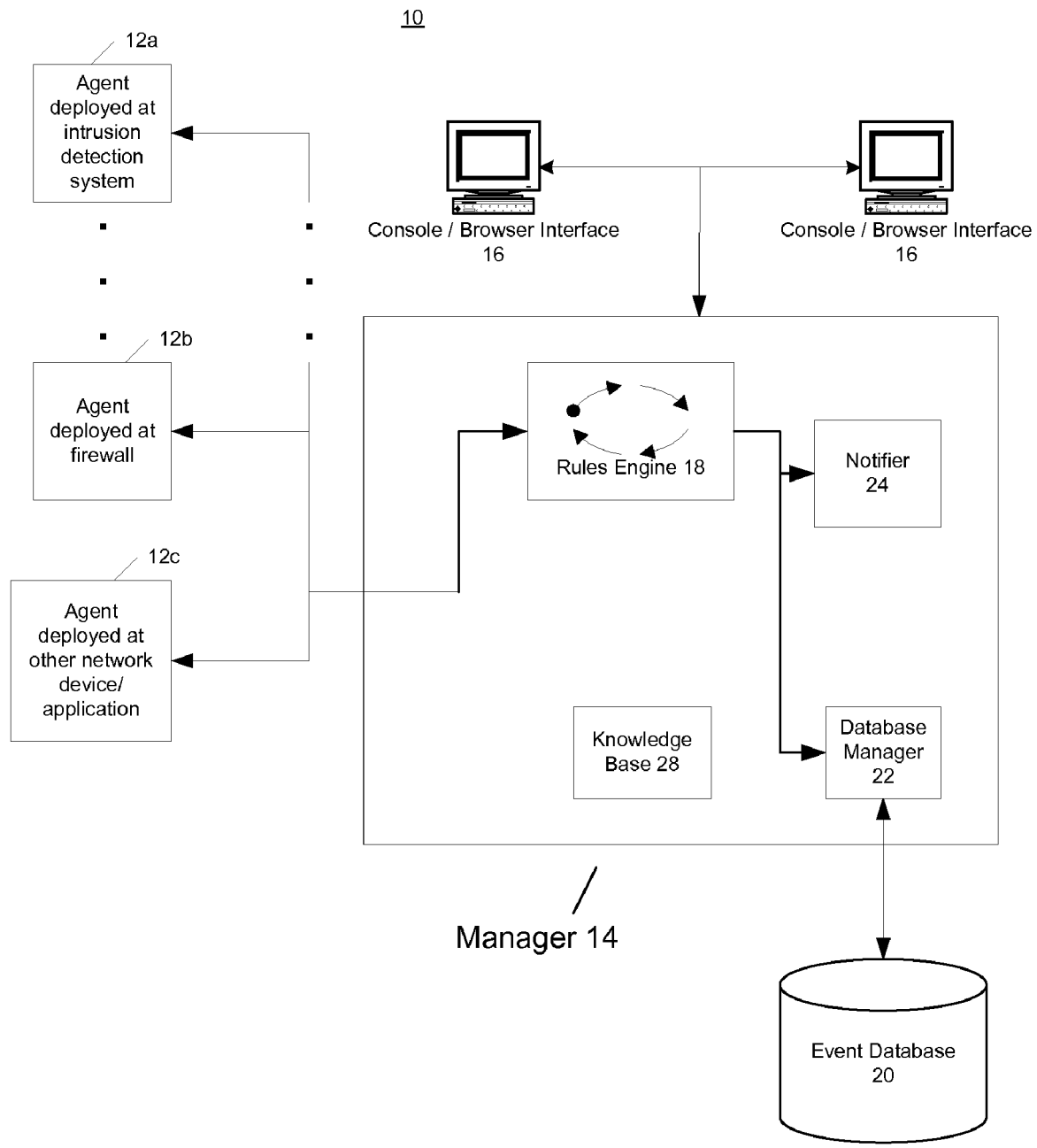
FIG. 1 is a block diagram illustrating a network security system in which embodiments of the present invention may be implemented.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component, such as event database 20. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 12 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Security Devices", filed Dec. 2, 2002, which is hereby incorporated fully by reference. Various attributes of the agents 12, such as event normalization (i.e., the mapping of "raw events" to some universal schema used by the network security system 10), and event aggregation, among others, are described in further detail in U.S. patent application Ser. No. 10/308,548, entitled "Modular Agent for Network Security Intrusion Detection System", filed Dec. 2, 2002, which is hereby incorporated fully by reference. As described in the referenced application, in one embodiment, the agent normalize module (e.g., block 54 in FIG. 5 of the referenced application) builds normalized security events from raw input data. One such data source an agent 12 can use to generate security events is some sort of message log or message concentrator, such as a Syslog.

However, if sensors having significantly different times on their clocks deposit raw events into a concentrator, an agent monitoring the concentrator device will not be able to adjust the device time to correspond with the agent time using a static time offset. Even when an agent is only monitoring a single non-concentrator sensor, it may be desirable to dynamically adjust the sensor time as opposed to applying one static time offset for all events since sensor clocks can drift.

Sensor Time Adjustment

Several embodiments of the present invention are now described with reference to FIG. 2. These embodiments can be added anywhere on the agent described in the referenced application. In one embodiment, a time adjustment module can be added to the agent (or the agent normalize module specifically) to perform some of the processes described herein. In block 202 the agent receives a new raw security event. Before the agent includes the timestamp included in the raw security event in the normalized security event, it performs time adjustment if necessary.

In one embodiment, the agent maintains a time offset for the sensor it is monitoring. This offset may be represented as a positive or negative number indicating by how much and in what direction the time included in the raw events should be adjusted. This offset may be maintained in a register, or some other data or memory structure.

In block 204, the offset is examined to determine whether it is zero (i.e., no offset). If the offset is zero—or in some other initialised or cleared state—then the sensor clock has been accurate in the past, or at least within a reasonable range of difference during the processing of the preceding raw event. In one embodiment, if the offset is zero, then, in block 206, a determination is made whether the event time (the timestamp included in the raw event) falls within a time window defined around the agent time (the time as known to the agent).

The time window defined around the agent time indicates the acceptable variation from agent time allowed. For example, the time window may be defined as agent time plus or minus 10 minutes. The window does not have to be symmetric around the agent time. For example it may be defined as agent time minus 20 minutes to agent time plus 5 minutes.

If the event time is inside the defined time window, then the event time is deemed accurate and not in need of adjustment, i.e., no offset required. Processing continues with the reception of the next raw sensor event in block 202. However, if in block 206 it is determined that the event time lies outside of the time window—that is, not within the acceptable range of variance from agent time—then in block 208 an offset is calculated. In one embodiment, the offset is calculated as agent time minus event time, but other equations are possible as well.

In block 210, the offset is set at the new offset calculated in block 208. In block 212, the offset is applied to the current event being processed. In one embodiment, this is done by adjusting the event time before including it in a normalized event using the offset. In one embodiment, the event time is adjusted by adding the offset to the event time. This means that when the offset is a positive number, the time adjustment is forward, and when the offset is a negative number, the time adjustment is backward. The event time is thus considered properly adjusted, and processing continues with the reception of the next raw event at block 202.

Several embodiments of the case when the offset is not zero (or initialised or cleared) at block 204 is now discussed, again with reference to FIG. 2. In one embodiment, if an offset has been set previously—for example during execution of block 210 on a past event—then the offset will not be zero. If a non-zero offset is observed in block 204, then in block 214 a determination is made whether the unadjusted event time (i.e., the event time before the offset is applied) falls within the time window defined around the agent time. The time window used in block 214 may be the same time window that is used in block 206, or it may be a different time window.

In one embodiment, if the unadjusted event time is inside the applicable time window around the agent time, then in block 216 the offset is cleared. In one embodiment, the offset is cleared by being set to zero, NULL, or some other initialised value. The event time is not adjusted, and processing continues at block 202 with the reception of a new event.

However, if in block 214 it is determined that the event time is outside of the time window around the agent time, then, in block 218, the event time is adjusted by applying the offset to the event time. In one embodiment, applying the offset is performed by adding the offset to the event time (or subtracting if the offset is negative).

In one embodiment, after the event time is adjusted by the offset in block 218, in block 220, a determination is made whether the adjusted event time (i.e., event time plus offset) is inside the time window around the agent time. If the adjusted time now falls inside the time window, then the new event time, as adjusted by the offset, is within an acceptable range, and processing continues at block 202 with the reception of a new event.

However, if in block 220 it is determined that the adjusted event time still falls outside the time window, then processing continues at block 208 with the determination of a new offset. As described above with reference to blocks 208-212, this new offset is then set as the offset to be used in the future, and is applied to the current event time being processed.

Figure 2:
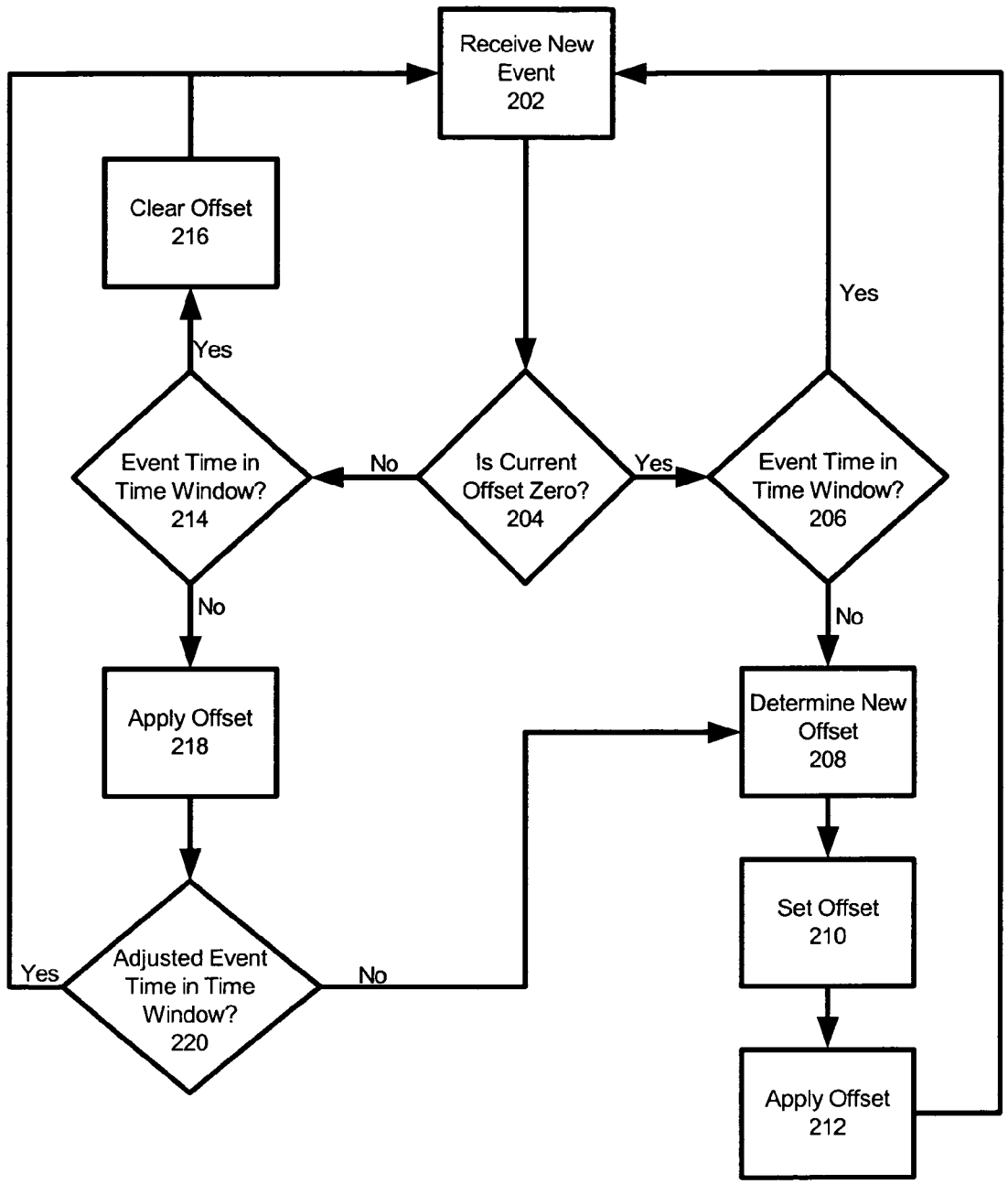
FIG. 2 is a flow diagram illustrating time adjustment processing according to one embodiment of the present invention.

In the description of FIG. 2 above, the offset was described as either zero or nonzero, and this was described as being material to the processing. However, an inactivated or reset offset could be a NULL character, or some other non-numeral value. Furthermore, even a numeric value may be defined as close enough to zero for the purposes of decision block 204 to evaluate to zero.

Thus, a method and apparatus for synchronizing security devices being monitored by a network security system have been described. In the forgoing description, various specific modules, such as the "synchronization module," have been described. However, these names are merely to describe and illustrate various aspects of the present invention, and in no way limit the scope of the present invention. Furthermore, various modules, such as the manager 14 and the agents 12 in FIG. 1, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of heir scope. Accordingly, the invention should be measured only in terms of the claims, which follow.

The invention claimed is:

1. A method performed by an agent device of a network security system, the method comprising:
   receiving a raw security event from a sensor device, wherein the raw security event originated in an event log that was generated by the sensor device, and wherein the raw security event includes an original timestamp that indicates a time determined at the sensor device;
   determining whether the original timestamp is within a non-zero timerange around a time determined at the agent device, the non-zero timerange representing a predetermined range of variance from the time determined at the agent device;
   identifying a time offset associated with the sensor device, the time offset representing a difference between the time determined at the sensor device and the time determined at the agent device, wherein the time offset was stored prior to receiving the raw security event;
   determining whether the time offset is in a non-initialized state;
   responsive to the original timestamp exceeding the timerange and responsive to the time offset being in the non-initialized state:
      adjusting the original timestamp by adding the time offset;
      generating a first modified security event by replacing the original timestamp in the raw security event with the adjusted timestamp; and
      sending the first modified security event for determining whether the first modified security event satisfies a condition of a rule, wherein the rule determines whether a security incident has occurred;
   responsive to the time offset being in an initialized state and the original timestamp being within the timerange:
      not applying the time offset; and
      sending the raw security event for determining whether the raw security event satisfies the condition of the rule;
   responsive to the time offset not being in an initialized state and the original timestamp being within the timerange:
      clearing the time offset to restore the time offset to an initialized state; and
      sending the raw security event for determining whether the raw security event satisfies the condition of the rule; and
   responsive to the time offset being in an initialized state and the original timestamp not being within the timerange:
      determining a new time offset;
      modifying the original timestamp by adding the new time offset to the original timestamp;

generating a second modified security event by replacing the original timestamp in the raw security event with the modified timestamp; and sending the second modified security event for determining whether the second modified security event satisfies the condition of the rule.

2. The method of claim 1, further comprising determining whether the adjusted timestamp is within the timerange.

3. The method of claim 2, further comprising recalculating the time offset if the adjusted timestamp is not within the timerange.

4. An agent device for a network security system, the agent device comprising:

a sensor interface to receive a raw security event from a sensor device, wherein the raw security event originated in an event log that was generated by the sensor device, and wherein the raw security event includes an original timestamp that indicates a time determined at the sensor device; and a processor configured to perform operations comprising:

determining whether the original timestamp is within a non-zero timerange around a time determined at the agent device, the non-zero timerange representing a predetermined range of variance from the time determined at the agent device;

identifying a time offset associated with the sensor device, the time offset representing a difference between the time determined at the sensor device and the time determined at the agent device, wherein the time offset was stored prior to receiving the raw security event;

determining whether the time offset is in a non-initialized state;

responsive to the original timestamp exceeding the time range and responsive to the time offset being in the non-initialized state:

adjusting the original timestamp by adding the time offset;

generating a modified security event by replacing the original timestamp in the raw security event with the adjusted timestamp; and sending the modified security event for determining whether the modified security event satisfies a condition of a rule, wherein the rule determines whether a security incident has occurred;

responsive to the time offset being in an initialized state and the original timestamp being within the timerange:

not applying the time offset; and sending the raw security event for determining whether the raw security event satisfies the condition of the rule;

responsive to the time offset not being in an initialized state and the original timestamp being within the timerange:

clearing the time offset to restore the time offset to an initialized state; and sending the raw security event for determining whether the raw security event satisfies the condition of the rule; and responsive to the time offset being in an initialized state and the original timestamp not being within the timerange:

determining a new time offset;

modifying the original timestamp by adding the new time offset to the original timestamp;

generating a second modified security event by replacing the original timestamp in the raw security event with the modified timestamp; and sending the second modified security event for determining whether the second modified security event satisfies the condition of the rule.

5. The agent device of claim 4, wherein the operations further comprise determining whether the adjusted timestamp is within the timerange.

6. The agent device of claim 5, wherein the operations further comprise recalculating the time offset if the adjusted timestamp is not within the timerange.

7. The agent device of claim 4, wherein the sensor device comprises a message concentrator.

8. The agent device of claim 7, wherein the message concentrator comprises a Syslog.

9. A non-transitory machine-readable medium having stored thereon data representing instructions that, when executed by a processor, cause the processor to perform operations comprising:

receiving a raw security event from a sensor device, wherein the raw security event originated in an event log that was generated by the sensor device, and wherein the raw security event includes an original timestamp that indicates a time determined at the sensor device;

determining whether the original timestamp is within a non-zero timerange around a time determined at an agent device, the non-zero timerange representing a predetermined range of variance from the time determined at the agent device;

identifying a time offset associated with the sensor device, the time offset representing a difference between the time determined at the sensor device and the time determined at the agent device, wherein the time offset was stored prior to receiving the raw security event;

determining whether the time offset is in a non-initialized state;

responsive to the original timestamp exceeding the timerange and responsive to the time offset being in the non-initialized state:

adjusting the original timestamp by adding the time offset;

generating a modified security event by replacing the original timestamp in the raw security event with the adjusted timestamp; and sending the modified security event for determining whether the modified security event satisfies a condition of a rule, wherein the rule determines whether a security incident has occurred;

responsive to the time offset being in an initialized state and the original timestamp being within the timerange:

not applying the time offset; and sending the raw security event for determining whether the raw security event satisfies the condition of the rule;

responsive to the time offset not being in an initialized state and the original timestamp being within the timerange:

clearing the time offset to restore the time offset to an initialized state; and sending the raw security event for determining whether the raw security event satisfies the condition of the rule; and responsive to the time offset being in an initialized state and the original timestamp not being within the timerange:

determining a new time offset;

modifying the original timestamp by adding the new time offset to the original timestamp;

generating a second modified security event by replacing the original timestamp in the raw security event with the modified timestamp; and sending the second modified security event for determining whether the second modified security event satisfies the condition of the rule.

10. The machine-readable medium of claim 9, wherein the instructions further cause the processor to determine whether the adjusted timestamp is within the timerange.

11. The machine-readable medium of claim 10, wherein the instructions further cause the processor to recalculate the time offset if the adjusted timestamp is not within the timerange.

12. A method for adjusting an original timestamp generated by a sensor device, wherein the method is performed by an agent device of a network security system, the method comprising:

identifying a time offset associated with the sensor device, the time offset representing a difference between a time determined at the sensor device and a time determined at the agent device;

determining whether an original timestamp indicating the time determined at the sensor device is within a non-zero timerange around the time determined at the agent device, the non-zero timerange representing a predetermined range of variance from the time determined at the agent device;

determining whether the time offset is in a non-initialized state;

responsive to the original timestamp exceeding the timerange and responsive to the time offset being in the non-initialized state:

adjusting the original timestamp by adding the time offset to the original timestamp;

identifying a security event that originated in an event log that was generated by the sensor device;

modifying the security event by replacing the original timestamp with the adjusted timestamp; and sending the modified security event including the adjusted timestamp for determining whether the modified security event satisfies a condition of a rule, wherein the rule determines whether a security incident has occurred;

responsive to the time offset being in an initialized state and the original timestamp being within the timerange:

not applying the time offset; and sending the raw security event for determining whether the raw security event satisfies the condition of the rule;

responsive to the time offset not being in an initialized state and the original timestamp being within the timerange:

clearing the time offset to restore the time offset to an initialized state; and sending the raw security event for determining whether the raw security event satisfies the condition of the rule; and responsive to the time offset being in an initialized state and the original timestamp not being within the timerange:

determining a new time offset;

modifying the original timestamp by adding the new time offset to the original timestamp;

generating a second modified security event by replacing the original timestamp in the raw security event with the modified timestamp; and sending the second modified security event for determining whether the second modified security event satisfies the condition of the rule.

* * * * *